US012687149B2

(12) United States Patent
    Colletta

(10) Patent No.: US 12,687,149 B2
(45) Date of Patent: Jul. 21, 2026

(54) LAND VEHICLE FOR TRANSPORTING PEOPLE AND/OR GOODS

(71) Applicants: Fabio Colletta, Rotella (IT); Rodolfo Danielli, Milan (IT)

(72) Inventor: Fabio Colletta, Rotella (IT)

(73) Assignees: Fabio Colletta, Rotella (IT); Rodolfo Danielli, Milan (IT)

( * ) Notice: Subject to any disclaimer, the term of this patent is extended or adjusted under 35 U.S.C. 154(b) by 94 days.

(21) Appl. No.: 18/715,408

(22) PCT Filed: Oct. 14, 2022

(86) PCT No.: PCT/EP2022/078644
    § 371 (c)(1),
    (2) Date: May 31, 2024

(87) PCT Pub. No.: WO2023/099070
    PCT Pub. Date: Jun. 8, 2023

(65) Prior Publication Data
    US 2025/0052224 A1      Feb. 13, 2025

(30) Foreign Application Priority Data
    Dec. 3, 2021    (IT) ........................ 102021000030692

(51) Int. Cl.
| | |
|---|---|
| *F03D 1/04* | (2006.01) |
| *B60L 53/52* | (2019.01) |
| *B60R 16/033* | (2006.01) |
| *B60S 1/62* | (2006.01) |
| *B62D 35/00* | (2006.01) |
| *F03D 9/11* | (2016.01) |
| *F03D 9/32* | (2016.01) |
    (Continued)

(52) U.S. Cl.
    CPC ............ *F03D 1/053* (2023.08); *B60R 16/033* (2013.01); *B60S 1/62* (2013.01); *B62D 35/005* (2013.01); *F03D 9/11* (2016.05); *F03D 9/32* (2016.05); *H02J 7/143* (2020.01); *B60L 53/52* (2019.02); *F05B 2270/323* (2013.01); *G01W 1/02* (2013.01); *Y02E 10/72* (2013.01)

(58) Field of Classification Search
    CPC ... F03D 1/053; F03D 9/11; F03D 9/32; B60R 16/033; B60S 1/62; B62D 35/005; H02J 7/143; B60L 53/52; B60L 1/00; B60L 8/006; F05B 2270/323; G01W 1/02
    See application file for complete search history.

(56) References Cited

U.S. PATENT DOCUMENTS

| | | |
|---|---|---|
| 2017/0082092 A1 | 3/2017 | Gaither |
| 2020/0200147 A1* | 6/2020 | Dietzel ................ B63H 20/007 |

FOREIGN PATENT DOCUMENTS

| | | |
|---|---|---|
| IT | 201800010148 A1 | 5/2020 |

OTHER PUBLICATIONS

International Search Report & Written Opinion dated Mar. 1, 2023, from corresponding International Application No. PCT/EP2022/078644.

* cited by examiner

*Primary Examiner* — Michael C Zarroli
(74) *Attorney, Agent, or Firm* — Troutman Pepper Locke LLP

(57) ABSTRACT

A land vehicle for transporting people and/or goods comprising a device for transforming kinetic wind energy into electrical energy, positioned in a front housing of the vehicle exposed to the wind against the direction of travel.

17 Claims, 8 Drawing Sheets

(51) Int. Cl.
    *H02J 7/14*           (2006.01)
    *G01W 1/02*         (2006.01)

LAND VEHICLE FOR TRANSPORTING PEOPLE AND/OR GOODS

CROSS-REFERENCE TO RELATED APPLICATION

The present application is a U.S. National Phase application under 35 U.S.C. § 371 of International PCT/EP2022/078644 filed Oct. 14, 2022, which claims priority of Italian Patent Application No. 102021000030692 filed Dec. 3, 2021. The entire contents of which are hereby incorporated by reference.

FIELD OF THE INVENTION

The present invention relates to a land vehicle for transporting people and/or goods.

BACKGROUND

One of the most current themes affecting the automotive industry is undoubtedly sustainability. For this reason, over recent years hybrid and completely electric vehicles have become more widespread, having innovative instruments that enable electrical energy to be generated for moving the vehicle.

One of these instruments is known as KERS, an acronym of Kinetic Energy Recovery System, which is an electromechanical device adapted to recover part of the kinetic energy of a vehicle while it is braking and transform it into mechanical or electric energy, which can then be used for driving the vehicle or for powering its electrical devices.

SUMMARY

The technical task underpinning the present invention is that of providing a land vehicle for transporting people and/or goods which enables the energy self-sufficiency of the vehicle itself to be increased.

Within the context of this technical task, an object of the invention is to provide a land vehicle for transporting people and/or goods which enables energy to be recovered and accumulated during its normal operation.

Another object of the invention is that of providing a land vehicle for transporting people and/or goods which enables the energy consumptions of the vehicle itself to be reduced.

The technical task, as well as these and other objects according to the present invention are achieved by providing a land vehicle for transporting people and/or goods, characterized in that it comprises a device for transforming kinetic wind energy into electrical energy, positioned in a front housing of the vehicle exposed to the wind against the direction of travel.

More precisely, said land vehicle for transporting people and/or goods comprises an electronic control unit, a vehicle advancement speed sensor, one or more atmospheric sensors of the conditions external to the vehicle comprising at least one temperature sensor, and a device for transforming the kinetic wind energy into electric energy, and is characterized in that said device comprises at least one variable geometry wind turbine with orientable blades, positioned in a front housing of the vehicle exposed to the wind against the direction of travel, said electronic control unit being configured to communicate with said speed sensor and with said one or more external atmospheric condition sensors and to set said device in real time on the basis of said advancement speed of the vehicle detected by said speed sensor and said environmental conditions external to the vehicle detected by said one or more external atmospheric condition sensors.

In particular, the vehicle comprises a storage battery for storing the electrical energy generated by said device.

In particular, the device comprises, upstream of said at least one turbine, a conveyor of a flow of wind against the direction of travel connecting said turbine to at least one outer front suction mouth of said housing communicating with the atmospheric environment external to the vehicle. Preferably, the conveyor comprises a conduit converging with a decreasing section towards the turbine.

In particular, the device comprises, downstream of said at least one turbine, ejection means for ejecting said flow of wind coming from said turbine towards the atmospheric environment external to the vehicle.

Preferably, said ejection means comprises a conduit diverging with an increasing section from said turbine.

Preferably, said ejection means further comprises at least one ejection mouth for ejecting said flow of wind towards the atmospheric environment external to the vehicle. Advantageously, said at least one suction mouth is positioned at a vertical front wall of said vehicle.

According to an embodiment of the invention said at least one ejection mouth is positioned on a side of the vehicle.

According to another embodiment of the invention said at least one ejection mouth is positioned at a front opening door of the vehicle.

According to a further embodiment of the invention said at least one ejection mouth is positioned below the vehicle.

Preferably said suction mouth has a shutter with variable opening configured to modulate the inlet of air and prevent the entry of foreign bodies.

In particular, said shutter has orientable wings or a sliding partition.

Advantageously the device has a system for defrosting said wind turbine, said conveyor, said ejection means and said shutter.

BRIEF DESCRIPTION OF THE DRAWINGS

Further characteristics and advantages of the invention will become more apparent from the description of a preferred, but not exclusive, embodiment of the apparatus of the land vehicle for transporting people and/or goods comprising a storage battery for storing the electrical energy according to the invention, which is illustrated by way of non-limiting example in the attached drawings, of which:

Figures 9A, 9B, 9C, 9D:
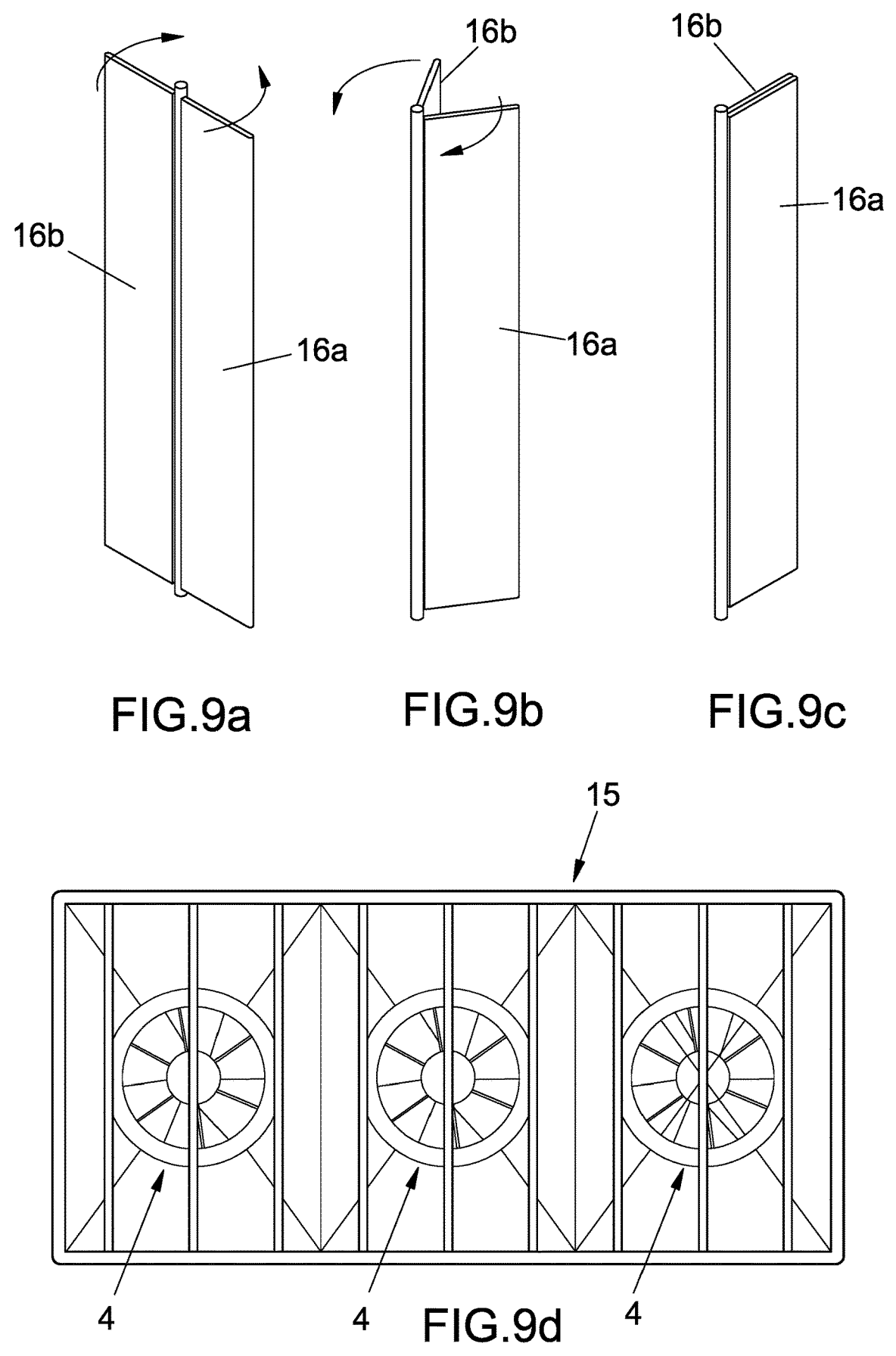

FIGS. 9a to 9e show a variant of the wings of the shutter in various configurations.

DETAILED-DESCRIPTION

Figure 1:
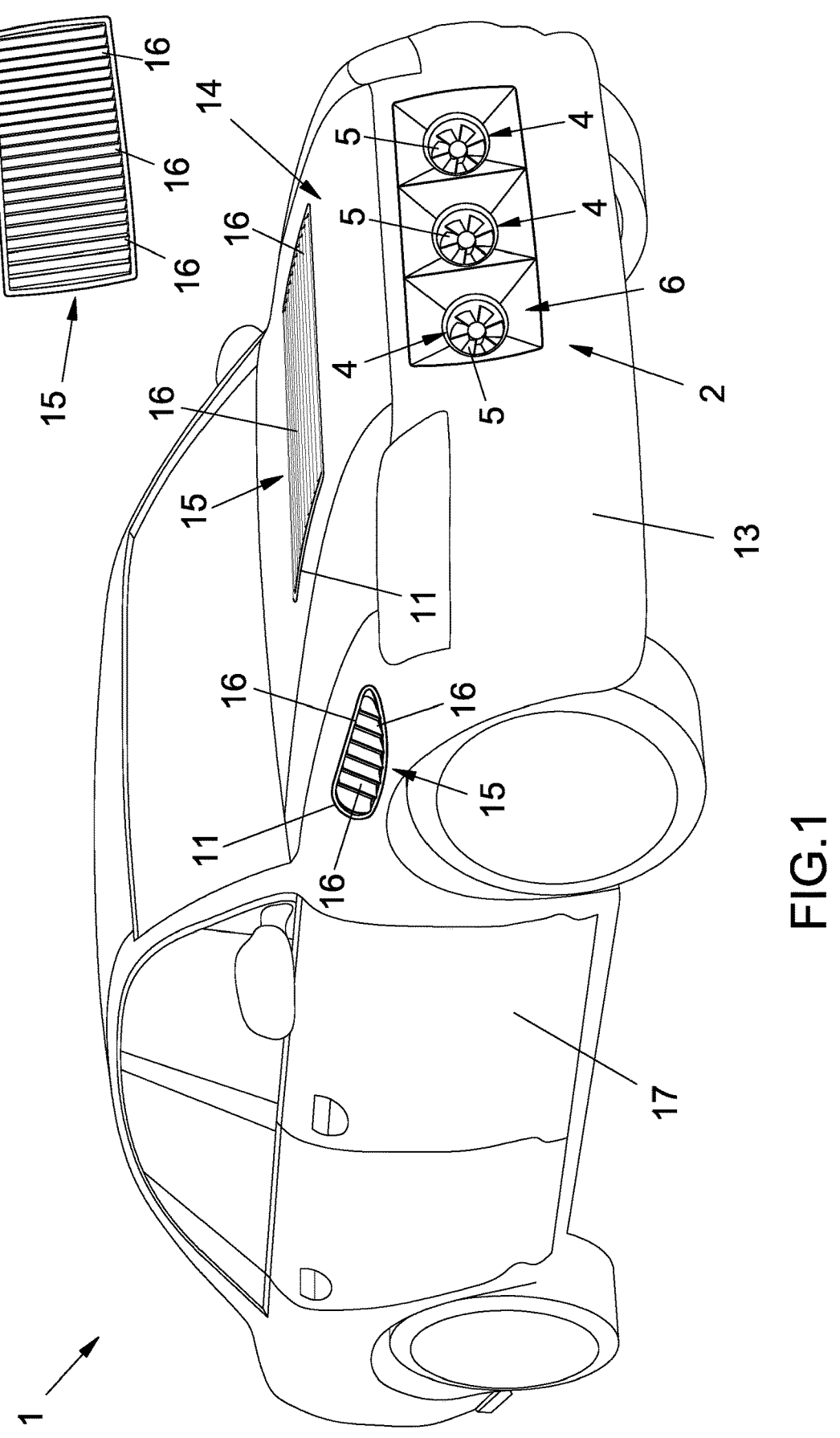
FIG. 1 shows a front perspective view of the land vehicle according to the present invention, where the suction mouth shutter has been removed for convenience purposes.
Figure 2:
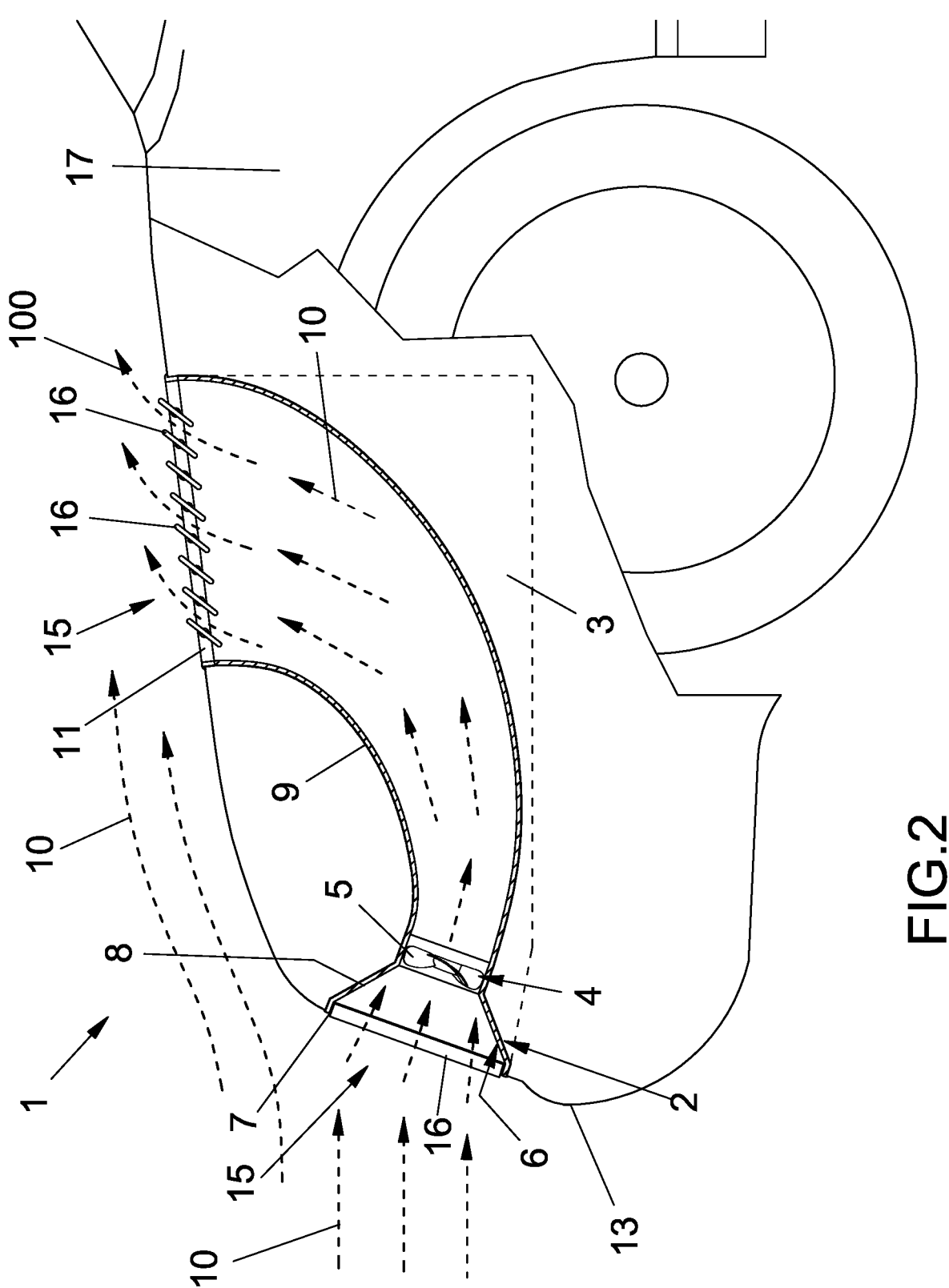
FIG. 2 illustrates a vertical section view of the transformation device according to the present invention.
Figure 3:
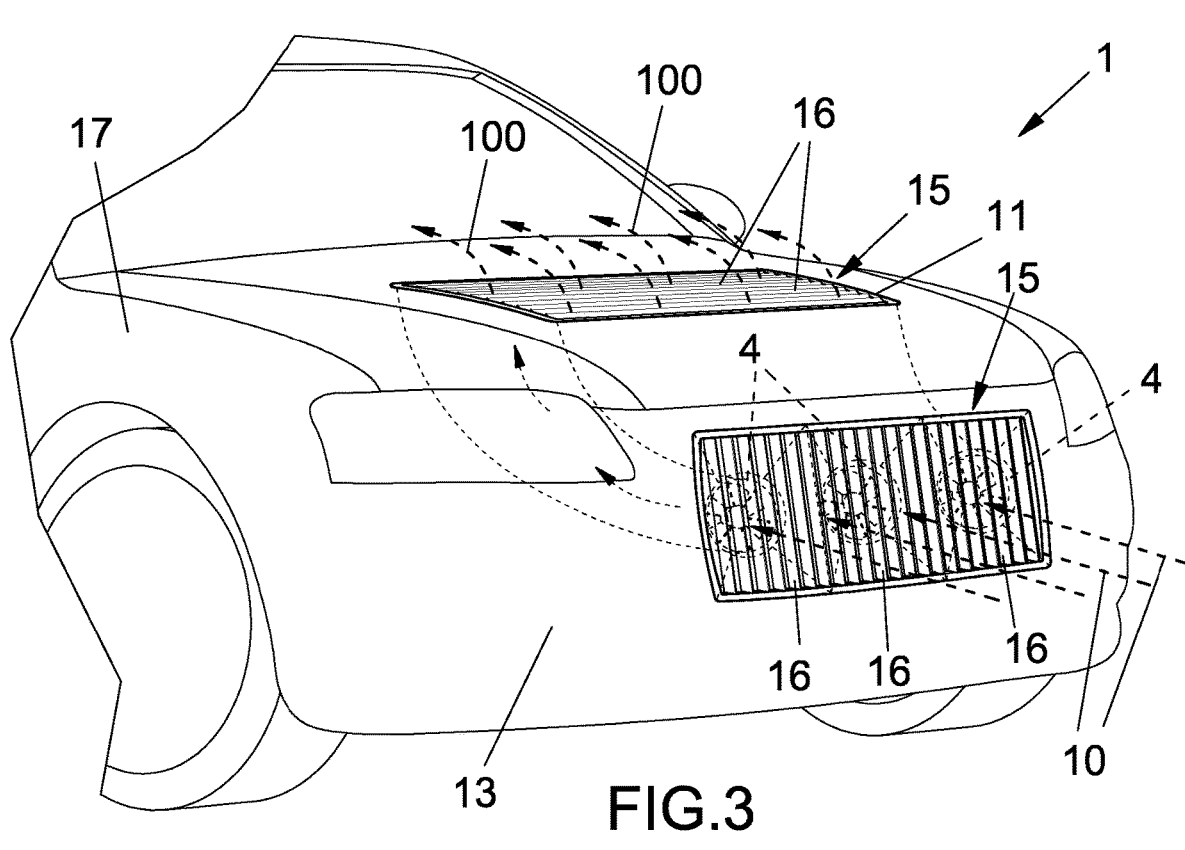
FIG. 3 shows a view of a solution for positioning the ejection mouth according to an embodiment of the invention.
Figure 4:
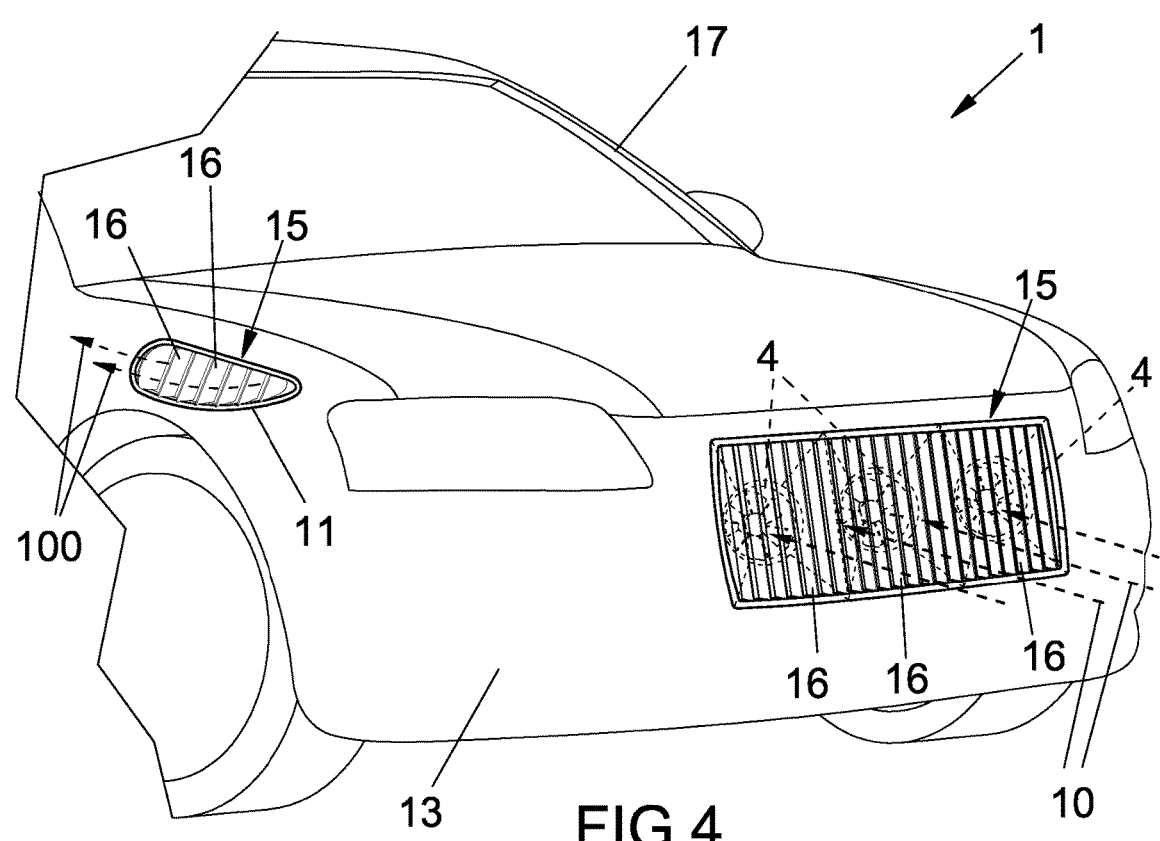
FIG. 4 shows a further view of a solution for positioning the ejection mouth according to an embodiment of the present invention.
Figures 5, 6:
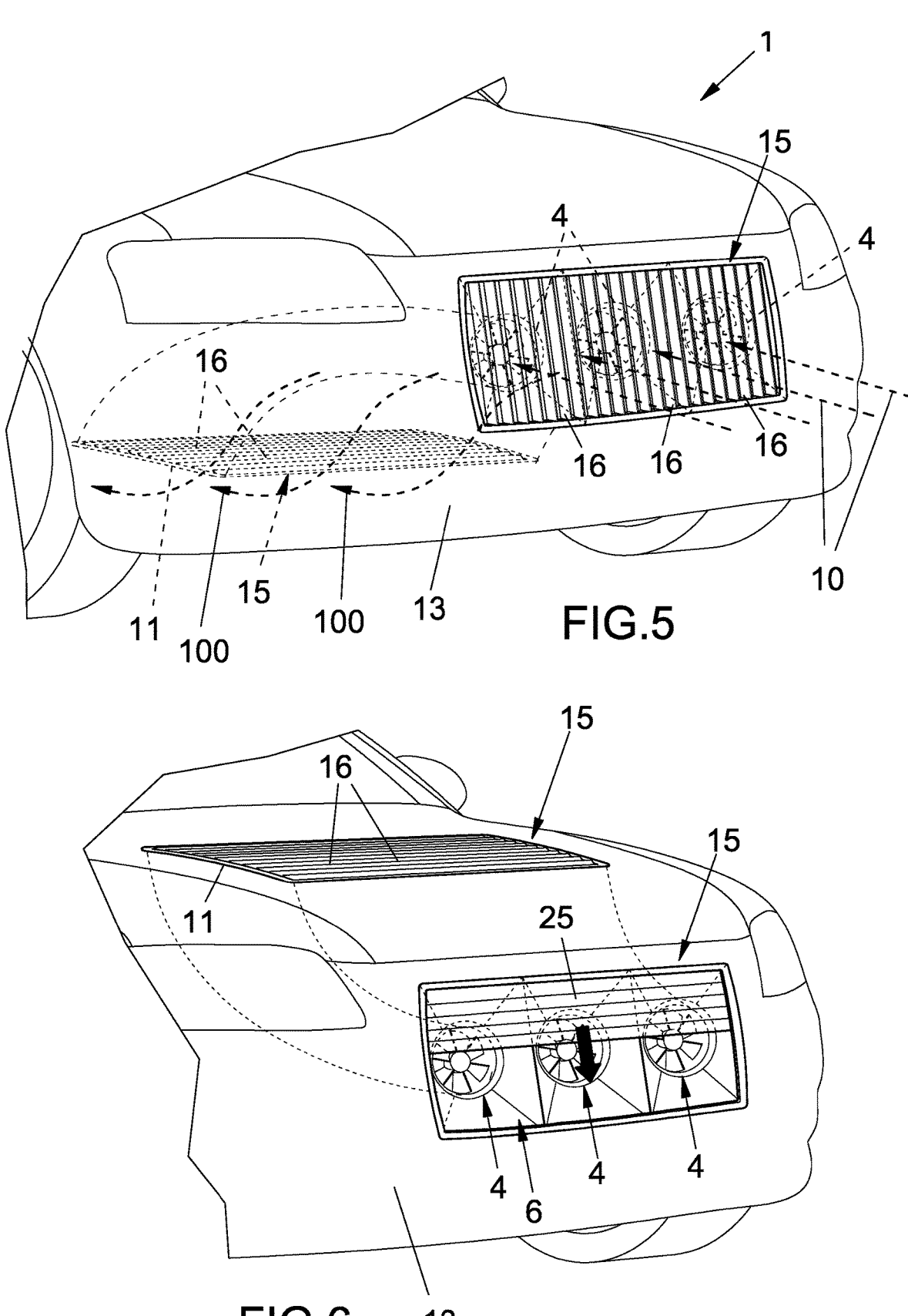
FIG. 5 shows a view of a further solution for positioning the ejection mouth according to an embodiment of the present invention.
FIG. 6 shows a view of the front portion of the vehicle with the shutter provided with a partition.

With reference to FIG. 1, a land vehicle for transporting people and/or goods, e.g. a car, denoted in its entirety by reference number 1 is shown.

The vehicle 1, as known, comprises an electrical energy storage battery (not shown in the figure).

The vehicle 1 further comprises a device 2 for transforming kinetic wind energy into electrical energy.

Advantageously such device 2 is positioned in a front housing 3 of the vehicle 1 which is therefore exposed to the wind against the direction of travel.

In this way it is possible to transform the kinetic energy of this flow of opposing wind into electrical energy which is stored in the electric storage battery.

In particular, the transformation device 2 preferably comprises at least one wind turbine 4. The wind turbine 4 is of the variable geometry type.

In particular, the wind turbine 4 has orientable blades 5.

Considering the dimensions and the installed power it may be advantageous to use a wind turbine of the permanent magnet type even if any other type of turbine suitable for use can naturally be used.

A conveyor 6 of a flow of wind 10 against the direction of travel is positioned upstream of said wind turbine 4.

The conveyor connects the turbine 4 to at least one external front suction mouth 7 of the housing 3 which in turn communicates with the atmospheric environment external to the vehicle.

The suction mouth 7 is positioned at a vertical front wall 13 of said vehicle 1, by way of non-limiting example, in the grille of the vehicle hood.

The conveyor 6 comprises a conduit 8 converging with a decreasing section which extends from the suction mouth 7 towards the turbine 4.

Ejection means 9,11 are positioned downstream of the turbine 4 for ejecting the flow of wind coming from the turbine 4 towards the atmospheric environment external to the vehicle 1.

The ejection means 9,11 comprise in particular a conduit 9 diverging with an increasing section which extends from said turbine 4 and at least one ejection mouth 11 for ejecting said flow of wind coming from the diverging conduit 9 towards the atmospheric environment external to the vehicle 1.

According to a first embodiment of the invention said at least one ejection mouth 11 may be positioned on a side 17 of the vehicle.

According to an embodiment of the invention, said at least one ejection mouth 11 may be positioned at a front opening door 14 of the vehicle 1, by way of non-limiting example, in the bonnet of the vehicle.

According to another embodiment of the invention, said at least one ejection mouth 11 may be positioned below the vehicle, in particular on the bottom of it.

This solution has the advantage of slowing down the air which flows below the vehicle and therefore stabilizes the vehicle itself.

The converging conduit 8 and the diverging conduit 9 are shaped like a Venturi tube (without intakes for the differential pressure gauge) having the turbine 4 at the minimum passage section. The suction mouth 7 has a shutter 15 with variable opening configured to modulate the flow of air that enters.

In a preferred embodiment, the shutter 15 may be provided with orientable wings 16 having the task of optimizing the flow of wind 10 entering the suction mouth 7.

In other embodiments, illustrated for example in FIGS. 9a to 9e, the shutter 15 may be provided with a series of reconfigurable wings each having two mutually hinged half-parts 16a, 16b: the two half-parts 16a, 16b are packed in an opening configuration of the shutter 15, are partially unfolded in the partial closing configuration of the shutter 15 and are completely unfolded in a total closure configuration of the shutter 15.

This solution is extremely functional as in the event of partially opening the grille itself the flow always remains perpendicular to the turbine.

The wings 16 move between a completely open position and a completely closed position of the suction mouth 7 in adverse weather conditions such as, for example, in the event of hail.

In another embodiment of the invention, the shutter 15 may be provided with a partition 25 sliding between a completely closed position and a completely open position.

Figure 10:
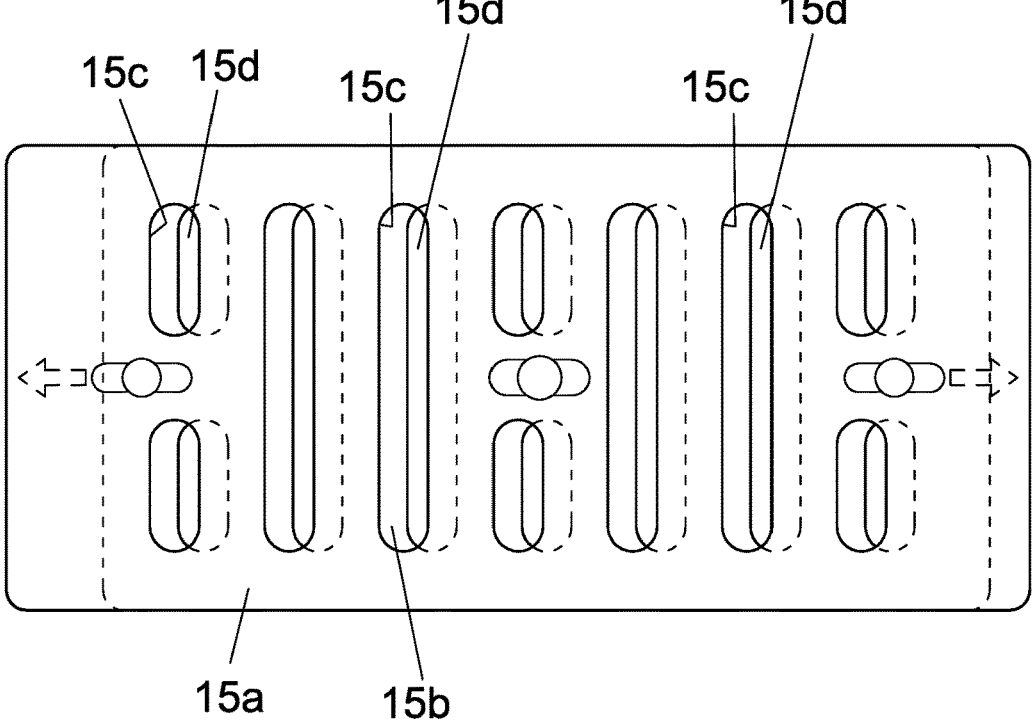
FIG. 10 shows a further variant of the shutter.

FIG. 10 shows a solution of the closed guillotine type for the shutter 15 consisting of two appropriately shaped plates 15a, 15b able to slide longitudinally on one another to open and close relevant holes 15c, 15d present thereon.

Also said at least one ejection mouth 11 is provided with a shutter 15 having for example movable wings 16 or a sliding partition 25 for optimizing the outlet flow from said ejection mouth 11.

The transformation device 2, according to the present invention, also has a system for defrosting the wind turbine, the conveyor, the ejection means and said shutter.

The defrosting system can be activated continuously or intermittently when the temperature sensor installed in the vehicle reports a temperature below a certain threshold to the electronic control unit driving the defrosting system.

The transformation device 2 is further provided with an ejection system for ejecting rainwater or vehicle washing water in the event of any stagnation thereof inside the vehicle.

Finally, the electronic control unit (not shown in the figure) of the vehicle is configured to set the transformation device in real time based on the detected advancement speed of the vehicle, and the environmental conditions external to the vehicle.

In this way it is possible to optimize the vehicle consumptions according to the actual running speed of the vehicle and also according to the atmospheric conditions, in order to obtain the maximum possible efficiency of the whole system.

The land vehicle 1 is normally provided, in addition to the aforementioned electronic control unit, also with a vehicle 1 advancement speed sensor, and with one or more sensors of the atmospheric conditions external to the vehicle 1 comprising at least one temperature sensor and usually also a rain sensor and/or a humidity sensor.

The vehicle's electronic control unit is therefore normally configured to communicate with the speed sensor and with the external atmospheric condition sensors and is advantageously and innovatively now also configured to set the device 2 in real time according to the advancement speed of the vehicle 1 detected by the speed sensor and according to the environmental conditions external to the vehicle 1 detected by the external atmospheric condition sensors.

Therefore, the electronic controller can in real time regulate the geometry of the wind turbine 4, regulate the opening of the suction mouth 7 and regulate the opening of the ejection mouth 11 in relation to the current running conditions detected by the speed sensor in order to keep the system efficiency always at optimal values.

The electronic controller can also, as already mentioned above, start the defrosting cycle when the external temperature detected by the temperature sensor drops below a certain threshold.

The electronic controller can also close the suction mouth 7 and deactivate the wind turbine 4 when the humidity sensor and/or the rain sensor indicate the presence of atmospheric phenomena (particularly rain, hail) which could damage the wind turbine 4 itself.

The electronic controller can also possibly close the ejection mouth 11 when the humidity sensor and/or the rain sensor indicate the presence of atmospheric phenomena (particularly rain, hail).

The entire transformation device 2 is sound proofed or made of sound-absorbent material.

The operation of the device for transforming kinetic wind energy into electrical energy 1s substantially as follows.

When the land vehicle 1 is moving, a flow of wind 10 is generated against the direction of travel which passes through the shutter 15 positioned at the external front suction mouth 7 of the vehicle 1 and is conveyed through the converging conduit 8 with a decreasing section of the conveyor 6 towards the wind turbine 4.

Thanks to the movement of the blades 5, the wind turbine 4, as known, transforms the flow of wind into electrical energy.

The electrical energy produced is stored in the storage battery present in the vehicle.

The outgoing flow of wind 100 is then ejected from the vehicle by means of the ejection means 9,11. In particular, after passing the wind turbine 4, the flow of wind 10 is channelled into the diverging conduit 9 with an increasing section positioned downstream of the wind turbine 4 which leads the flow towards the ejection mouth 11 (which can be positioned above the bonnet or to the side of the vehicle) to be taken completely outside the vehicle.

The converging conveyor 6 enables the flow of wind entering the turbine to have the maximum useful effect which is also optimized by the diverging configuration of the discharge of the turbine 4.

The converging and diverging conduits of the transformation device 2 can preferably be dismantled for the inspection and maintenance of the entire transformation device.

For that purpose they can be made in two half parts which can be coupled to one another using automatic clips.

Figure 7A:
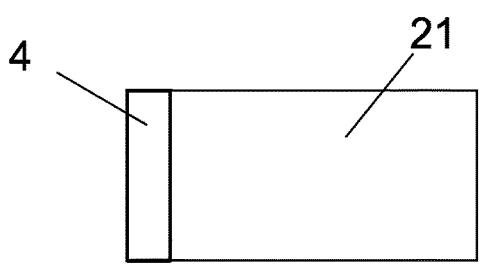
FIGS. 7a, 7b, 7c, 7d and 7e show variants for channeling the air flow processed by the turbine.

FIGS. 7*a*, 7*b*, 7*c*, 7*d* and 7*e* show variants for channeling the air flow processed by the turbine. In particular, FIG. 7*a* shows a turbine without a suction conveyor and provided with a discharge conveyor 21.

Figure 7B:
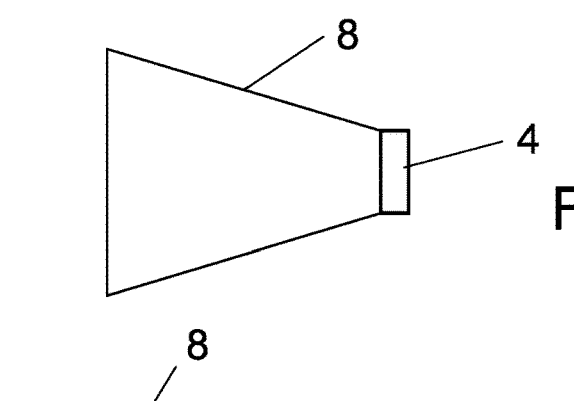

FIG. 7*b* shows a turbine provided with a converging suction conveyor 8 but without a discharge conveyor.

Figure 7C:
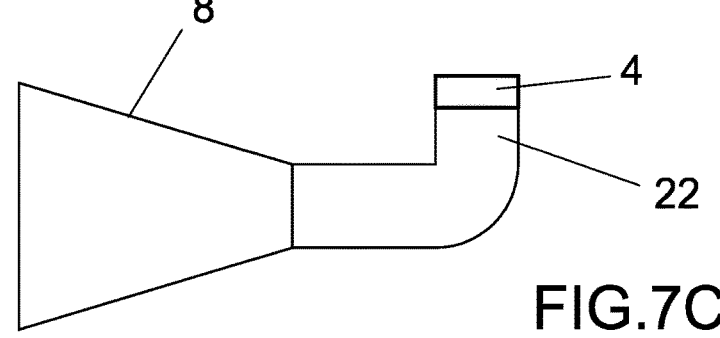

FIG. 7*c* shows a turbine provided with a suction conveyor including a converging segment followed by an angular segment 22 with a constant section but without a discharge conveyor.

Figure 7D:
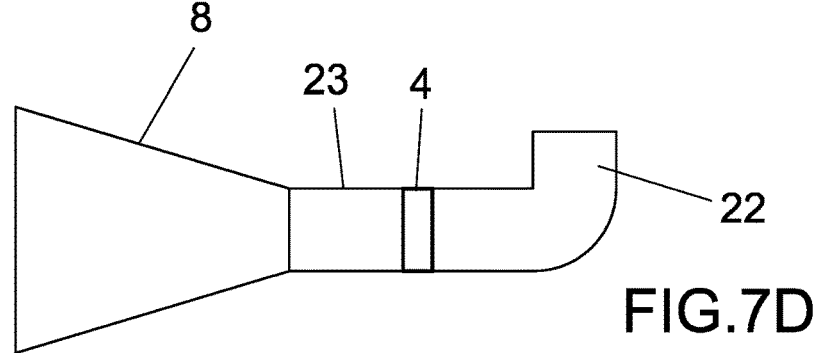

FIG. 7*d* shows a turbine having a suction conveyor including a converging segment 8 followed by a segment with a constant section 23 and an angular discharge conveyor 24 with a constant section.

Figure 7E:
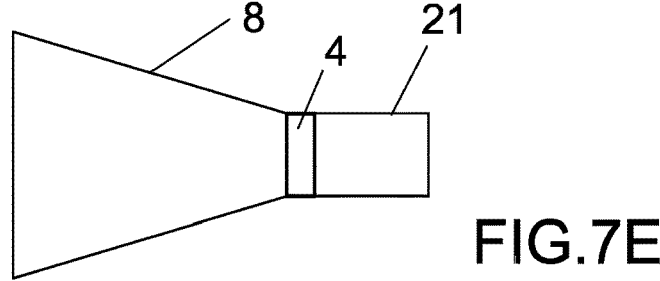
Figure 8:
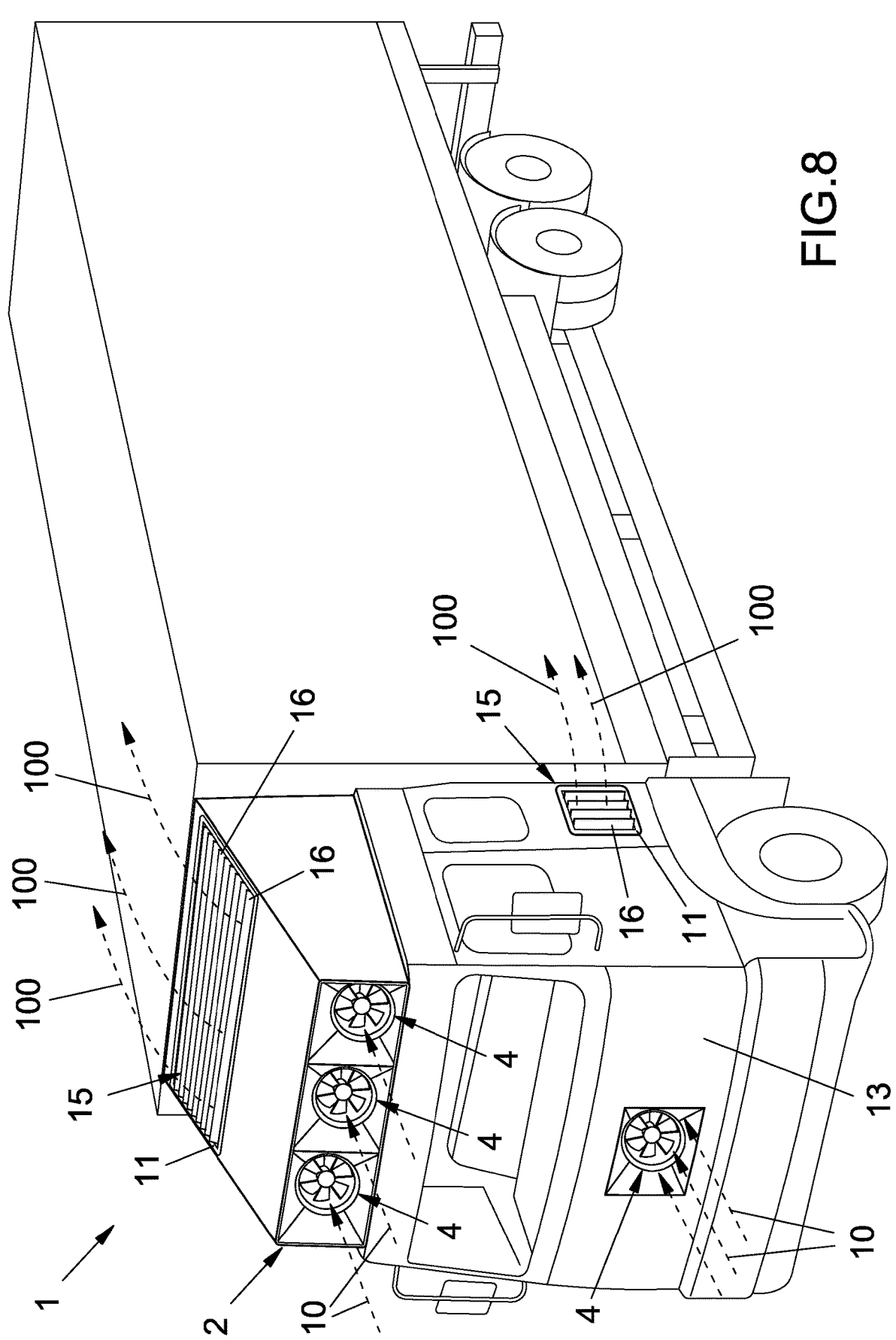
FIG. 8 shows a heavy vehicle in which the transformation device is positioned above the front windscreen.
Figure 9E:
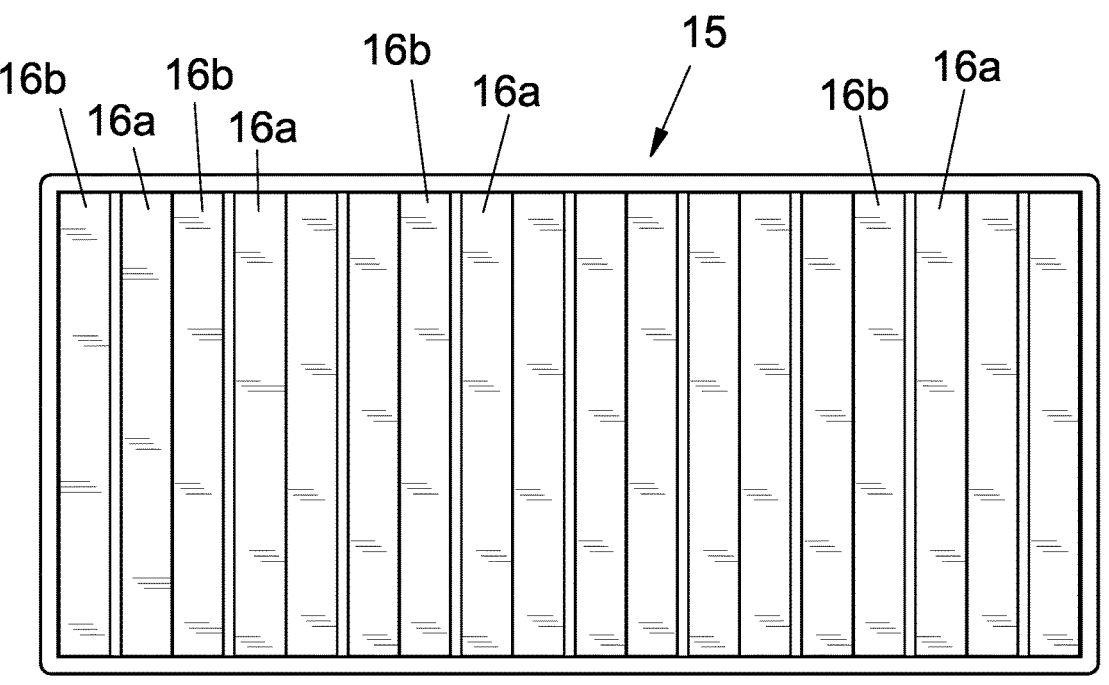

FIG. 7*e* shows a turbine having a suction conveyor including a converging segment 8 and a discharge conveyor 21 with a constant diameter.

In the description reference is made to turbines that produce electrical energy which is stored in an electric storage battery. However, it is also possible to envisage that the energy produced by the turbines is directly used to power the electric motors for the advancement of the vehicle without passing through the storage battery.

The land vehicle as conceived herein is susceptible to numerous modifications and variants, all falling within the scope of the inventive concept; furthermore, all the details are replaceable by technically equivalent elements.

The invention claimed is:

1. A land vehicle for transporting people and/or goods, comprising:
   an electronic control unit,
   a vehicle advancement speed sensor operatively connected to the electronic control unit,
   one or more atmospheric sensors operatively connected to the electronic control unit and configured to sense conditions external to the vehicle, the one or more atmospheric sensors comprising at least one temperature sensor,
   a device configured to transform the kinetic energy of the wind into electric energy, said device comprising at least one variable geometry wind turbine with orientable blades, positioned in a front housing of the vehicle exposed to a wind against the direction of travel, said electronic control unit being configured to communicate with said speed sensor and with said one or more external atmospheric condition sensors and to control said device in real time on the basis of said advancement speed of the vehicle detected by said speed sensor and said environmental conditions external to the vehicle detected by said one or more external atmospheric condition sensors, and
   a conveyor of the flow of wind against the direction of travel connecting said turbine to an outer front suction mouth of said housing communicating with the atmospheric environment external to the vehicle, wherein said outer front suction mouth is positioned at a vertical front wall of said vehicle in a grille of a hood of said vehicle.

2. The land vehicle for transporting people and/or goods according to claim 1, further comprising a storage battery for storing the electrical energy generated by said device.

3. The land vehicle for transporting people and/or goods according to claim 1, wherein said conveyor comprises a conduit converging with a decreasing section towards the turbine.

4. The land vehicle for transporting people and/or goods according to claim 1, said device further comprising, downstream of said at least one turbine, ejection means for ejecting said flow of wind coming from said turbine towards the atmospheric environment external to the vehicle.

5. The land vehicle for transporting people and/or goods according to claim 4, wherein said ejection means comprise a conduit diverging with an increasing section from said turbine.

6. The land vehicle for transporting people and/or goods according to claim 5, said ejection means further comprising at least one ejection mouth for ejecting said flow of wind towards the atmospheric environment external to the vehicle.

7. The land vehicle for transporting people and/or goods according to claim 1, further comprising at least one additional suction mouth positioned at a vertical front wall of said vehicle, on a side of said vehicle, at a front opening door of said vehicle, below said vehicle, or behind said vehicle.

8. The land vehicle for transporting people and/or goods according to claim 1, wherein said suction mouth has a shutter with variable opening configured to modulate the flow of air that enters.

9. The land vehicle for transporting people and/or goods according to claim 8, wherein said shutter has orientable or reconfigurable wings, a sliding partition, or two appropriately shaped plates able to slide longitudinally on one another to open and close relevant holes present thereon.

10. The land vehicle for transporting people and/or goods according to claim 4, wherein said device has a system for defrosting said wind turbine of said conveyor, of said ejection means and of said shutter.

11. The land vehicle for transporting people and/or goods according to claim 1, wherein said one or more external environmental condition sensors further comprise a rain sensor and/or a humidity sensor.

12. The land vehicle for transporting people and/or goods according to claim 1, wherein said electronic controller is configured to regulate in real time the geometry of said wind turbine in relation to the current running conditions detected by said speed sensor.

13. The land vehicle for transporting people and/or goods according to claim 1, wherein said electronic controller is configured to regulate in real time the opening of said suction mouth in relation to the current running conditions detected by said speed sensor.

14. The land vehicle for transporting people and/or goods according to claim 11, wherein said electronic controller is configured to close said suction mouth and to deactivate said wind turbine when the humidity sensor and/or the rain sensor indicate the presence of atmospheric phenomena.

15. The land vehicle for transporting people and/or goods according to claim 1, wherein an axis of rotation of the turbine is parallel to the flow of wind against the direction of travel as the flow of wind enters the suction mouth.

16. The land vehicle for transporting people and/or goods according to claim 9, wherein said shutter comprises the orientable or reconfigurable wings, wherein each respective orientable or reconfigurable wing comprises two mutually hinged half-parts configured to move between an open configuration of the shutter where the half-parts are fully folded, a partially closed configuration of the shutter where the half-parts are partially unfolded, and a closed configuration of the shutter where the half-parts are completely unfolded.

17. The land vehicle for transporting people and/or goods according to claim 9, wherein the shutter comprises the sliding partition, the sliding partition comprising a first plate having a first plurality of holes defined there through and a second plate having a second plurality of holes defined therethrough, the first plate disposed upstream of the second plate relative to the flow of wind through the shutter, wherein the first plate and second plate are configured to slide longitudinally relative to one another to move between an open position wherein the first plurality of holes are fully aligned with the second plurality of holes, a partially closed position wherein the first plurality of holes are partially aligned with the second plurality of holes, and a closed position wherein the first plurality of holes are fully misaligned with the second plurality of holes.

* * * * *